United States Patent [19] [11] 4,094,859
Chang [45] June 13, 1978

[54] PROCESS FOR THE PREPARATION OF COPOLYMERS OF THIODIETHANOL USING A PHOSPHOROUS ACID-METAL SULFATE CATALYST

[75] Inventor: Eugene Yue Chieh Chang, Bridgewater, N.J.

[73] Assignee: American Cyanamid Company, Stamford, Conn.

[21] Appl. No.: 779,114

[22] Filed: Mar. 18, 1977

[51] Int. Cl.$^2$ ............................................. C08G 75/12
[52] U.S. Cl. ................................... 260/47 R; 260/79
[58] Field of Search ............................... 260/47 R, 79

[56] References Cited

U.S. PATENT DOCUMENTS 3,951,927 4/1976 Aloia ....................................... 260/79
3,985,708 10/1976 Chang et al. ....................... 260/47 R

*Primary Examiner*—Lester L. Lee
*Attorney, Agent, or Firm*—Frank M. Van Riet

[57] ABSTRACT

An improved process for the preparation of linear, high molecular weight elastomeric polymers of thiodiethanol is disclosed wherein the catalyst system is a mixture of phosphorous acid and manganese, iron, cobalt, nickel, copper or zinc sulfate.

7 Claims, No Drawings

PROCESS FOR THE PREPARATION OF COPOLYMERS OF THIODIETHANOL USING A PHOSPHOROUS ACID-METAL SULFATE CATALYST

This invention relates to an improved process for the preparation of linear, high molecular weight elastomeric polymers of thiodiethanol. More particularly, it relates to a process employing a novel catalyst system in the preparation of linear, high molecular weight elastomeric polymers of thiodiethanol.

Thiodiethanol is a well-known diol, the hydroxyl groups of which exhibit unusual reactivity because of their positioning beta to a sulfur atom in an aliphatic chain. Unlike alkanediols, such as ethylene glycol or butanediol, thiodiethanol quite readily undergoes an autocondensation reaction under the influence of heat and certain acidic dehydrating catalysts, such as hydrogen chloride, see Ballard et al., U.S. Pat. No. 2,484,369. Low molecular weight, rubber-like materials were obtained.

Woodward et al., J. Poly. Sci. 41, 219–223; 225–230 and 231–239 (1959), studied the acid-catalyzed autocondensation of thiodiethanol with hydrochloric acid and phosphorus pentoxide, and copolymerization thereof with aliphatic hydroxyl containing compounds. Low molecular weight, waxy, water-soluble polymers resulted, in addition to a ring closure reaction which produced extremely obnoxious smelling thioxane and dithiane. Phosphorus pentoxide afforded products ranging from viscous liquids to rubbery waxes. Some indication of copolymerization with diethylene, trimethylene and butylene glycols was found, however, no useful rubbery polymers were observed.

Thiodiethanol has been copolymerized with equimolar amounts of 1,6-hexanediol in the presence of p-toluenesulfonic acid to give low molecular weight waxy polymers (Holtschmidt, U.S. Pat. No. 2,998,413); with triethylene glycol, 1,6-hexanediol and trimethylolpropane in the presence of phosphorous acid to give low molecular weight polymers useful as polyurethane intermediates (Holtschmidt, French Pat. No. 1,373,471) and with thiopropionic acid to give hydroxy terminated low molecular weight polymers suitable for polyurethanes (Holtschmidt, German Pat. No. 1,045,641). These products have been reacted with aromatic diisocyanates to provide polyurethane elastomers; see, for example, U.S. Pat. No. 2,862,962; French Pat. No. 1,373,471; German Pat. Nos. 1,007,502; 1,045,641 and 1,108,903 and British Patent Specification Nos. 791,854 and 818,359.

However, neither the autocondensation of thiodiethanol, nor its cocondensation with aliphatic diols was ever reported to yield useful elastomers other than the polyurethane elastomers described above.

The preparation of elastomeric copolymers derived from the condensation of a major proportion of thiodiethanol with one or more aliphatic diols is described by Aloia in his U.S. Pat. No. 3,951,927 and Chang in U.S. Pat. No. 3,985,708 the disclosures of which are incorporated herein by reference.

The instant process comprises preparing linear, high molecular weight elastomeric polymers of thiodiethanol which comprises condensing a monomer charge comprising thiodiethanol alone or a major proportion of thiodiethanol with (A) one or more saturated or unsaturated aliphatic diols, or (B) one or more dihydric phenolic compounds or (C) mixtures of (A) and (B), at a temperature of from about 150° C to about 200° C under conditions whereby water formed in the reaction is removed and in the presence of a catalyst comprising from about 0.01 to about 3.0 percent, by weight, based on the weight of the monomer charge of phosphorous acid, and from about 0.01 to about 3.0 percent, by weight, same basis, of a sulfate of manganese, iron, cobalt, nickel, copper or zinc.

More particularly, the vulcanizable elastomer composition which can be produced by the process of the instant invention comprise those having either Formula A or B, Formula A comprising:

  (A)

wherein $+OG+$ comprises randomly alternating structural units (I) and (II)

  (I)

  (II)

wherein R is one or more radicals which are the residues remaining on removal of two hydroxyl groups from diols selected from (a) saturated, linear, branched chain or cyclic diols, (b) linear, branched chain or cyclic diols containing external unsaturation in the form of a group having an allylic hydrogen atom or (c) mixtures of (a) and (b); being characterized in that (1) $n$ is an integer sufficient to provide a molecular weight of at least about 8000, (2) the molar ratio of structural units (I) to structural units (II) is not less than 1 and, (3) in any event, said structural units —OG— contain no more than about 10 mole percent of said external unsaturation; and Formula B comprising

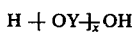

wherein $+OY+$ comprises randomly alternating structural units (III), (IV), and, optionally, (V).

  (III)

  (IV)

  (V)

wherein $R^1$ represents the residue remaining on removal of two phenolic hydrogen groups from a dihydric phenolic compound and $R^2$ represents one or more radicals which are the residues remaining on removal of two hydroxyl groups from diols selected from (d) saturated, linear, branched chain or aliphatic cyclic diols, (e) linear, branched chain or aliphatic cyclic diols containing external unsaturation in the form of a group having an allylic hydrogen atom or (f) mixtures of (d) and (e) being characterized in that (4) the ratio of structural units III to structural units IV, or optionally, to the total of structural units IV and V, is not less than 1, (5) $x$ is an integer sufficient to provide a molecular weight of at least about 8000 and (6) in any event, said structural unit $+OY+$ contains no more than about 10 mole percent of said external unsaturation.

Any aliphatic diol which will condense with aliphatic dicarboxylic acids, as for example in the preparation of aliphatic polyesters, will be suitable for the preparation of copolymers in accordance with the process of the present invention. The following list is merely representative of the diols which can be used, and the invention is not limited thereto. They include: ethylene glycol, propane-1,2-diol, propane-1,3-diol, butane-1,4-diol, pentane-1,5-diol, hexane-1,6-diol, diethylene glycol; cyclohexane di(lower alkylene) diols, such as cyclohexane 1,2- and 1,4-dimethanol, either cis or trans or mixtures thereof, cyclobutane di(lower alkylene) diols, such as cyclobutane-1,2-dimethanol, aralkylene diols, such as the bis(hydroxyethyl) ether of hydroquinone or resorcinol; the monoallyl ether of trimethylolpropane, the monoallyl ether of glycerol, 3-cyclohexene-1,1-dimethanol; bicyclic aliphatic diols, such as 5-morbornene-2,2-dimethanol, 5-morbornene-2,3-dimethanol etc.

Preferred saturated diols include diethylene glycol, butane-1,4-diol, bis(hydroxyethyl)ether of hydroquinone. Preferred unsaturated diols include monoallyl ether of trimethyolopropane, monoallyl ether of glycerol and 3-cyclohexene-1,4-dimethanol.

The expression "external unsaturation" as used herein refers to the position of the unsaturation in the diol molecule such that at least one continuous chain of atoms remains in the diol, extending between the two diol oxygen atoms, which chain does not include any carbon-to-carbon double bonds. The unsaturated diols enumerated above as preferred unsaturated diols are examples of diols containing external unsaturation having an allylic hydrogen atom.

Examples of dihydric phenolic compounds useful in the present process include (e) bisphenols of the general formula:

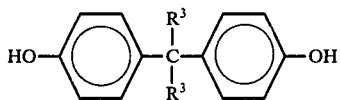

wherein the $R^3$'s may be the same or different and selected from hydrogen alkyl, or taken together with the carbon atom, combine to form a cycloalkylene bridge e.g. Bisphenol A (isopropylidene-bis phenol); dihydroxy aromatic compounds, such as hydroquinone, resorcinol, naphthalene diols, and the like; polymers of (a) or (b), for example, polyesters of hydroquinone with dibasic acids, or polyethers of a bisphenol with epichlorohydrin, wherein the terminal groups or chain-ends are substantially phenolic residues, and the like.

As mentioned hereinabove, the polycondensation reaction of thiodiethanol requires an acidic catalyst. Those disclosed for this use have pK values less than about 5 and include toluenesulfonic acid, sulfuric acid, phosphoric acid and phosphorous acid. In reality, only phosphorous acid is of practical value, the others producing significant amounts of by-products, principally thioxane and dithiane via ring closure. They also produce undesirable color in the condensate. Phosphorous acid, on the other hand, is a weak acid which does not cause discoloration of the condensate. However, in order to obtain high molecular weight elastomeric gums using phosphorous acid, the reaction requires an unduly long time, the yield of copolymer is not very high and the gum obtained is soft, tacky and difficult to process. While it is possible to incorporate a small amount of a triol, such as trimethylolpropane, into the composition to form a tough gum using phosphorous acid, the resulting elastomer is highly branched or cross-linked and difficult to process.

It is therefore obvious that a need exists for an efficient means for producing linear, high molecular weight elastomeric gums by copolymerizing a major proportion of thiodiethanol with one or more aliphatic diols, as described hereinabove.

I have now discovered that the aforementioned polycondensation of thiodiethanol, which is catalyzed with phosphorous acid, can be substantially accelerated by adding to the reaction mixture a small amount of the sulfate salt of manganese, iron, cobalt, nickel, copper or zinc.

It is surprising that the phosphorous acid-metal sulfate cocatalyst system is so effective in accelerating the condensation since the metal sulfates have little to no effect in catalyzing the reaction when used alone and, in fact, they are not as good as phosphorous acid.

The catalyst system has the advantages of (1) reducing, by a significant amount, the time required to attain high molecular weight elastomeric gums, (2) significantly increasing the yield of useful copolymer based on conversion of the monomers to linear polymer, and (3) reducing the amount of by-product thioxane and dithiane resulting from ring closure of thiodiethanol.

The metal sulfates useful as co-catalysts with phosphorous acid include the common divalent and trivalent sulfates of manganese, iron, cobalt, nickel, copper and zinc, either as their commonly available hydrates or as the anhydrous salts. The salts may also be added as aqueous solutions, if desired, although there is no advantage to doing so. The preferred metal sulfates are copper and zinc sulfate.

In accordance with the invention, the polycondensation reaction may be conducted in one of two ways. Thus, a first condensation may be conducted which involves reaction of the thiodiethanol and the comonomer(s) in the presence of the phosphorous acid at a temperature in the range of about 150°–200° C until an essentially theoretical amount of water of condensation is removed from the reaction mixture. This step yields a viscous, syrup-like, low molecular weight condensate. A second step involves continuation of the condensation in the additional presence of the metal sulfate at a temperature in the range of about 150°–200° C under reduced pressure (less than about 10 mm Hg) to build up the molecular weight with the further removal of water. Alternatively, both the phosphorous acid and the metal sulfate may be incorporated into the reaction mixture at the start of the reaction and the reaction then conducted under the conditions described.

The phosphorous acid may be used in the polycondensation reaction in an amount ranging from about 0.01 to 3 percent, by weight, based on the total weight of monomeric reactants. It is preferred to use about 0.1 to 1 percent, by weight, of phosphorous acid. The metal sulfates may be used in an amount ranging from about 0.01 to 3 percent, by weight, same basis, and preferably about 0.1 to 1 percent, by weight. More than about 3 percent of either catalyst component may be used, but no advantage results therefrom.

While there may be many mechanical ways to accomplish the reaction, one suitable method is to conduct an initial condensation in the presence of phosphorous acid and metal sulfate to produce a low molecular weight, viscous syrup. This condensation can be conducted readily in conventional stirred reactors. The syrup may then be transferred to a suitable reactor equipped with high shear agitation and vacuum means in order to facilitate mixing of the highly viscous gum formed during continued condensation. The metal sulfate may be added at this stage if not already present. One suitable device is an Atlantic 2CV Reactor, a high shear sigma mixer, manufactured by Atlantic Research Co., Gainesville, Va. It is also possible to conduct the entire condensation reaction in this or similar devices.

The mill handling characteristics of an elastomer can be evaluated by the so-called Mooney value (ML-4). The Mooney value of natural rubber, e.g., is high, due to naturally occurring cross-links. Natural rubber, with a Mooney value of about 60, must be broken down on a rubber mill before compounding with conventional rubber additives. Most synthetic elastomers may have Mooney values in the range of about 20–50, but elastomers with Mooney values of 5–10 can be handled on a rubber mill. The elastomers produced according to the process of the present invention have Mooney values of 10–50, preferably above about 30, as measured in accordance with ASTM # D1646.

As described in the above-mentioned Aloia and Chang et al. patents, the elastomers may be cured into useful elastomeric products by conventional techniques.

The following examples are set forth for purpose of illustration only and are not to be construed as limitations on the present invention except as set forth in the appended claims. All parts and percentages are by weight unless otherwise specified.

EXAMPLE 1 (COMPARATIVE)

A. Thiodiethanol, 1800 grams, and 200 grams of diethylene glycol were heated in the presence of 0.3% by weight, 6 grams of phosphorous acid at 190° C for 1.5 hours. A vacuum was then applied and the reaction continued for 8 hours at 180° C. A viscous syrup was obtained; 1480 grams, 74% yield.

B. Phosphorous acid, 1% by weight, was added to the syrup and the reaction continued for 18 hours at 170° C/5–6 mm Hg. There was obtained a very soft gum in 70.5% yield.

EXAMPLE 2

Following the procedure of Example 1 (B), portions of syrup obtained in a condensation similar to Example 1 (A) were heated for 18 hours at 170° C/5–6 mm Hg in the presence of the metal sulfates shown in Table I.

Table I

| Metal Sulfate | % By wt. | % Yield | Results |
|---|---|---|---|
| $CoSO_4(7H_2O)$ | 0.5 | 68.5 | Tough gum |
| $NiSO_4(6H_2O)$ | 0.7 | 70.0 | Tough gum |
| $ZnSO_4(7H_2O)$ | 0.7 | 64.7 | Very tough gum |
| $FeSO_4(7H_2O)$ | 0.5 | 68.5 | Tough gum |
| $CuSO_4(5H_2O)$ | 0.5 | 68.0 | Very tough gum |
|  | 0.2* | 68.5 | Very tough gum |
| Zn p-toluene sulfonate** | 1.0 | 26.0 | Very soft gum |
| p-toluenesulfonic acid | 0.05 | 66.5 | Soft gum |
|  | 0.1 | 61.7 | Tough gum |
|  | 0.25 | 41.0 | Very tough gum |

*Reaction conducted at 180° C
**See Canadian Pat. No. 952,537

The data in Table I illustrates that after 18 hours reaction at 170° C/5–6 mm Hg, the metal sulfates, when used in combination with phosphorous acid provide good yields of tough to very tough gums as compared with phosphorous acid alone. The data also shows that good tough gums are obtainable using p-toluenesulfonic acid, a known catalyst, but the yield of polymer decreases significantly. Finally, the data illustrates that zinc p-toluenesulfonate, a catalyst disclosed in Canadian Pat. No. 952,537 as preferred, is ineffective.

EXAMPLE 3

A mixture of 81 grams of thiodiethanol, 4.5 grams of diethylene glycol, 4.5 grams of the monoallyl ether of trimethylolpropane, 0.27 gram of phosphorous acid and 0.5 gram of copper sulfate ($CuSO_4\ 5H_2O$) was heated at 200° C for 1 hour. The temperature was lowered to 185° C, a vacuum (20 inches Hg) was applied for 2 hours, reduced to 3 mm Hg and the mixture heated for 18 hours at 170° C. There was obtained a 67.5% yield of a tough gum, having a Mooney value (ML-4 at 212° F) of 39Δ–2. The Δ–2 indicates good linearity).

Forty grams of the gum was compounded with the following ingredients:

|  | Parts by Weight |
|---|---|
| Carbon black | 20 |
| Hydrated Sodium Silico Aluminate | 6 |
| Polyamine D* | 1.6 |
| Sulfur | 0.6 |
| 2-Mercaptobenzothiazole | 0.6 |
| Tetramethylthiuram disulfide | 0.6 |

*A mixture of aliphatic and alicyclic polyethyleneamines having an average molecular weight approximating that of pentaethylene hexamine.

The composition was cured for 1 hour at 320° F, followed by a post-cure for 18 hours at 100° C. The cured elastomer gave the following properties:

| Hardness, Shore A | 87 |
|---|---|
| Modulus, psi, at 100% | 1124 |
| Tensile, psi | 1700 |
| Elongation, % | 154 |
| Compression Set, % |  |
| 120° C/22 Hours | 16.5 |
| 120° C/70 Hours | 28 |

EXAMPLE 4

The procedure of Example 2 is again followed except that the diethylene glycol is omitted. Again, a very tough gum is recovered.

EXAMPLE 5

Again following the procedure of Example 2 except that the charge comprises 41.25 grams of thiodiethanol, 5.0 grams of the dihydroxyethyl ether of hydroquinone and 3.8 parts of trimethylolpropane, monoallyl ether, a tough, elastomeric gum is produced.

EXAMPLE 6

The procedure of Example 2 is again followed. The charge comprises 352 grams of thiodiethanol, 28 grams of trimethylolpropane, monoallyl ether and 20 grams of p-xylene-,α'-diol and a tough gum results.

EXAMPLE 7

A mixture of 3864 grams of thiodiethanol, 412 grams of the monoallylether of trimethylolpropane, 12 grams of a commercially available antioxidant and 24 grams of phosphorous acid is heated for 4 hours at 190° C under a nitrogen atmosphere and then for 30 minutes at 150° C/25 inches vacuum. To 1440 grams of the resultant polymer are added 360 grams of isopropylidenebisphenol and 4.4 grams of phosphoric acid. The mixture is heated at 190° C/10 mm Hg for 2 hours and about 720 grams of the resulting precondensate syrup are blended with 0.75% of $N_1SO_4(6H_2O)$. The reaction mixture is then heated to 170° C for 4 hours. A tough, rubbery gum is recovered.

EXAMPLE 8

The procedure of Example 7 is again followed except that the monoallylether of trimethylolpropane is omitted. The thiodiethanol is heated in the presence of 0.15% of phosphorous acid at 190° C for 4½ hours and the isopropylidenebisphenol is then added. The reaction mixture is then heated to 220° C/15 mm Hg for 1½ hours in the presence of 3.0% of $CuSO_4(5H_2O)$. A rubbery gum is recovered in excellent yield.

EXAMPLES 9 AND 10

Replacing the isopropylidenebisphenol of Example 7 with (9) resorcinol and (10) hydroquinone achieve essentially the same results.

EXAMPLE 11

The incorporation of 1.0% of trimethylolpropane into the monomer charge of Example 2 results in the recovery of a slightly, cross-linked, elastomeric gum of increased toughness and molecular weight.

I claim:

1. A process for the preparation of a linear, high molecular weight elastomeric polymer of thiodiethanol which comprises condensing a monomer charge comprising thiodiethanol or a major proportion of thiodiethanol with (A) one or more saturated or unsaturated aliphatic diols, or (B) one or more dihydric phenolic compounds, or (C) mixtures of (A) and (B), at a temperature in the range of about 150° to 200° C, under conditions whereby water formed in the reaction is removed and in the presence of a catalyst comprising from about 0.01 to 3 percent by weight of phosphorous acid and from about 0.01 to 3 percent by weight of manganese, iron, cobalt, nickel, copper or zinc sulfate.

2. The process of claim 1 wherein said copolymer of thiodiethanol is represented by the formula:

wherein $+OG+$ comprises randomly alternating structural units (I) and (II):

$$+OC_2H_4SC_2H_4+ \qquad \text{(I)}$$

$$+OR+ \qquad \text{(II)}$$

wherein R is one or more radicals which are the residues remaining on removal of two aliphatic hydroxyl groups from diols selected from (a) saturated linear, branched chain or cyclic diols, (b) linear, branched chain or cyclic diols containing external unsaturation in the form of a group having an allylic hydrogen atom or (c) mixtures of (a) and (b); being characterized in that (1) n is an integer sufficient to provide a molecular weight of at least about 8000; (2) the molar ratio of structural units (I) to structural units (II) is not less than 1 and (3), in any event, said structural units $+OG+$ contain no more than about 10 mole percent of said external unsaturation.

3. The process of claim 1 wherein said catalyst system comprises phosphorous acid and copper sulfate.

4. The process of claim 1 wherein said catalyst system comprises phosphorous acid and zinc sulfate.

5. The process of claim 1 wherein said copolymer of thiodiethanol is represented by the formula:

wherein $+OY+$ comprises randomly alternating structural units (III), (IV) and, optionally, (V)

$$+OC_2H_4SC_2H_4+ \qquad \text{(III)}$$

$$+OR^1+ \qquad \text{(IV)}$$

$$+OR^2+ \qquad \text{(V)}$$

wherein $R^1$ represents the residue remaining on removal of two phenolic hydroxyl groups from a dihydric phenolic compound and $R^2$ represents one or more radicals which are the residues remaining on removal of two hydroxyl groups from diols selected from (d) saturated, linear, branched chain or aliphatic diols, (e) linear, branched chain or aliphatic cyclic diols containing external unsaturation in the form of a group having an allylic hydrogen atom or (f) mixtures of (d) and (e), being characterized in that (4) the molar ratio of structural units (III) to structural units (IV) or, optionally, to the total of structural units (III) and (IV), is not less than 1, (5) x is an integer sufficient to provide a molecular weight of at least about 8000 and (6) in any event, said structural unit $-OY-$ contains no more than about 10 mole percent of said external unsaturation.

6. The process of claim 5 wherein said catalyst system comprises phosphorous acid and copper sulfate.

7. The process of claim 5 wherein said catalyst system comprises phosphorous acid and zinc sulfate.

* * * * *